(12) United States Patent
Frances et al.

(10) Patent No.: US 11,964,425 B2
(45) Date of Patent: Apr. 23, 2024

(54) METHOD FOR PRODUCING A THREE-DIMENSIONAL PRINTED ARTICLE

(71) Applicants: Elkem Silicones USA Corp., East Brunswick, NJ (US); Elkem Silicones France SAS, Lyons (FR)

(72) Inventors: Jean-Marc Frances, Meyzieu (FR); Remi Thiria, Fort Mill, SC (US); Matthew Kihara, Camarillo, CA (US); Brian Price, Rock Hill, SC (US)

(73) Assignees: Elkem Silicones USA Corp.; Elkem Silicones France SAS, Lyons (FR)

( * ) Notice: Subject to any disclaimer, the term of this patent is extended or adjusted under 35 U.S.C. 154(b) by 31 days.

(21) Appl. No.: 17/741,043

(22) Filed: May 10, 2022

(65) Prior Publication Data
US 2022/0379551 A1    Dec. 1, 2022

Related U.S. Application Data

(60) Provisional application No. 63/187,628, filed on May 12, 2021.

(51) Int. Cl.
| | | |
|---|---|---|
| *C08F 2/46* | (2006.01) | |
| *B29C 64/129* | (2017.01) | |
| *B29C 64/264* | (2017.01) | |
| *B33Y 10/00* | (2015.01) | |
| *B33Y 70/00* | (2020.01) | |
| *C01B 33/14* | (2006.01) | |
| *C08F 2/50* | (2006.01) | |
| *C08G 61/04* | (2006.01) | |
| *C08L 83/06* | (2006.01) | |
| *B29K 33/00* | (2006.01) | |
| *B29K 105/00* | (2006.01) | |
| *B29K 105/16* | (2006.01) | |
| *B29K 509/02* | (2006.01) | |

(52) U.S. Cl.
CPC .......... *B29C 64/129* (2017.08); *B29C 64/264* (2017.08); *B33Y 10/00* (2014.12); *B33Y 70/00* (2014.12); *C01B 33/14* (2013.01); *C08L 83/06* (2013.01); *B29K 2033/08* (2013.01); *B29K 2105/0094* (2013.01); *B29K 2105/16* (2013.01); *B29K 2509/02* (2013.01); *B29K 2995/0088* (2013.01)

(58) Field of Classification Search
CPC ... B29C 64/129; B29C 64/264; B29C 64/106; C08L 83/06; C08L 83/00; C08L 2312/06; C08K 3/36; C08K 5/53; C08G 77/20; B33Y 10/00; B33Y 70/00; C01B 33/14; B29K 2995/0088; B29K 2105/0094; B29K 2105/16; B29K 2509/02; B29K 2033/08
USPC ................. 522/99, 1, 6, 71, 189, 184; 520/1
See application file for complete search history.

(56) References Cited

U.S. PATENT DOCUMENTS

| | | | |
|---|---|---|---|
| 2004/0266940 A1* | 12/2004 | Issari | C08L 101/00 524/860 |
| 2008/0004464 A1 | 1/2008 | Murer et al. | |
| 2014/0131908 A1 | 5/2014 | Sun et al. | |
| 2016/0168177 A1 | 6/2016 | Cunningham et al. | |
| 2020/0071525 A1 | 3/2020 | Folch et al. | |
| 2020/0108548 A1 | 4/2020 | Frances et al. | |
| 2021/0332191 A1 | 10/2021 | Maliverney et al. | |
| 2022/0380549 A1* | 12/2022 | Frances | C08K 3/36 |

FOREIGN PATENT DOCUMENTS

| | | | |
|---|---|---|---|
| EP | 462032 A1 | 12/1991 | |
| FR | 2320324 A1 | 3/1977 | |
| FR | 2764894 B1 | 9/1999 | |
| WO | 2014108364 A1 | 7/2014 | |
| WO | 2014126837 A2 | 8/2014 | |
| WO | 2015107333 A1 | 7/2015 | |
| WO | 2015197495 A1 | 12/2015 | |
| WO | 2016044547 A1 | 3/2016 | |
| WO | 2016071241 A1 | 5/2016 | |
| WO | 2016109819 A2 | 7/2016 | |
| WO | 2016134972 A1 | 9/2016 | |
| WO | 2016140891 A1 | 9/2016 | |
| WO | 2016181149 A1 | 11/2016 | |
| WO | 2016188930 A1 | 12/2016 | |
| WO | 201740874 A1 | 3/2017 | |
| WO | 2018/206689 A1 | 11/2018 | |
| WO | 2018/234643 A1 | 12/2018 | |
| WO | WO-2019241731 A1 * | 12/2019 | ............... B22C 9/04 |

* cited by examiner

*Primary Examiner* — Jessica Whiteley
(74) *Attorney, Agent, or Firm* — McBEE MOORE & VANIK IP, LLC

(57) ABSTRACT

The present invention relates to a method for producing a three-dimensional (3D) printed article with a photocurable silicone composition involving a silicone containing as end-group specific (meth)acrylate groups.

8 Claims, No Drawings

METHOD FOR PRODUCING A THREE-DIMENSIONAL PRINTED ARTICLE

CROSS-REFERENCE TO RELATED APPLICATIONS

This application is a non-provisional application claiming priority to U.S. Application No. 63/187,628, filed 12 May 2021, the contents of which are hereby incorporated by reference in their entirety.

TECHNICAL FIELD

The present invention relates to a method for producing a three-dimensional (3D) printed article using a photocurable composition comprising (meth)acrylate silicone polymers.

BACKGROUND OF THE INVENTION 3D printing techniques (otherwise known as additive manufacturing (AM), rapid prototyping, or layered manufacturing) encompass a variety of different technologies and are used to create three-dimensional objects of almost any shape or geometry, without the need for moulds or machining. Nowadays, additive manufacturing is experiencing very strong dynamics and has important growth potential due to the multitude of possible commercial applications. To allow an increase of its use, it is essential to broaden the range of materials that can be used with an additive manufacturing equipment.

An important class of curable silicone compositions cures through thermosetting crosslinking, their use with a 3D-printer is complex and hardly compatible with additive manufacturing processes. Indeed, in a layer by layer 3D-printing process each layer has to retain its shape. As the height of product increases the lower layers do not hold their shape and flow resulting in a distortion or a collapse of the built structure. As a result, improper shape of silicone parts is obtained.

Several solutions have been made to circumvent this printability issue. For example, In WO2018/206689 a silicone 3D-printed object was achieved via a 3D-Liquid Deposition Modeling process with curable silicone compositions having adequate rheological properties allowing to avoid a collapse or a deformation of the printed object at room temperature before complete curing. The major drawback of such method is a lack of precision of the process (>100 microns/layer) and the need to carry out a post-treatment of the finished object in order to ensure that the curing process is completely finished.

Photopolymerization-based 3D printing techniques are now getting an increased interest. They start from a liquid material either to locally deposit and cure it or to selectively cure it from a liquid vat. Examples of such technologies are UV-Stereolithography (SLA), UV-Digital Light processing (DLP), Continuous Liquid Interface Production (CLIP), UV-extrusion and Inkjet Deposition.

UV-Stereolithography (SLA) is disclosed, for example, in WO2015197495. For example, UV-Stereolithography (SLA) uses laser beam which is generally moved in the X-Y (horizontal) plane by a scanner system. Motors guided by information from the generated data source drive mirrors that send the laser beam over the surface.

UV-Digital Light processing (DLP) is disclosed, for example, in WO2016181149 and US20140131908. In a UV-Digital Light processing (DLP) a 3D model is sent to the printer, and a vat of liquid polymer is exposed to light from a DLP projector under safelight conditions. The DLP projector displays the image of the 3D model onto the liquid polymer. The DLP projector can be installed under the window which can be made of transparent elastomeric membrane in which the UV light coming from the DLP projector shines through.

Continuous Liquid Interface Production (CLIP, originally Continuous Liquid Interphase Printing) is disclosed, for example, in WO2014126837 and WO2016140891, which, for example, uses photo polymerization to create smooth-sided solid objects of a wide variety of shapes.

Extrusion 3D printing process is disclosed, for example, in WO2015107333, WO2016109819 and WO2016134972. For example, in this process, the material is extruded through a nozzle to print one cross-section of an object, which may be repeated for each layer. An energy source can be attached directly to the nozzle such that it immediately follows extrusion for immediate cure or can be separated from the nozzle for delayed cure. The nozzle or build platform generally moves in the X-Y (horizontal) plane before moving in the Z-axis (vertical) plane once each layer is complete. The UV cure can be immediate after deposition or the plate moves under UV light to give a delay between deposition and UV cure. A support material may be used to avoid extruding a filament material in the air. Some post-processing treatments may be used to improve the quality of the printed surface.

Inkjet Deposition is disclosed, for example, in WO201740874, WO2016071241, WO2016134972, WO2016188930, WO2016044547 and WO2014108364, which, for example, uses material jetting printer which has a print head moving around a print area jetting the particular liquid curable composition for example by UV polymerization. The ability of the inkjet nozzle to form a droplet, as well as its volume and its velocity, are affected by the surface tension of the material.

As 3D photopolymerization is based on using monomers/oligomers in a liquid state that can be cured/photopolymerized upon exposure to light source of specific wavelength, photocurable silicone composition are of great interest due to their many advantages of the cured material such as flexibility, biocompatibility, insulating properties for electrical and electronic components, and good chemical, temperature and weather resistance.

Photocurable liquid silicone compositions which are nowadays used in 3D printing are mainly polyaddition curable silicone composition coupled to a photoactivatable catalyst. The problem with this technology is that the catalysis of the reaction is not instantaneous, and the cured product often requires post-curing when using for example a 3D-inkjet printing.

Another new approach is described in US2020071525 in which is described a photocurable poly(siloxane) composition for making stereolithographic 3D-printed silicone structures, comprising:
(a) a first polymerizable poly(siloxane) having a first end-group organic function and a second end-group organic function, each end-group comprising an acrylate or a methacryloxypropyl groups,
(b) a second polymerizable poly(siloxane) comprising repeating units, at least some of the repeating units having a sidechain polymerizable group.
(c) a photoinitiator which is preferably ethyl (2,4,6-trimethylbenzoyl) phenyl phosphinate (TPO-L), and
(d) a sensitizer which is preferably isopropyl thioxanthone (ITX).

In particular, the preferred component (a) containing terminal methacryloxypropyl groups has the following formula:

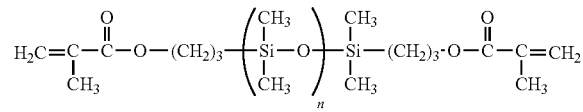

which has a preferred molecular weight from about 10 kDa to about 60 kDa. It is described as being suitable for building microdevices and the 3D-printed structure preferably has a low Young's modulus on the order of 0.5-1 MPa and an elongation-at-break of about 140%. A maximum of about 160% of elongation-at-break was obtained by raising the content of the photoinitiator concentration to about 0.8% (% by weight of the overall weight of the composition). However, at this content the photoinitiator is inducing a yellow-coloured material after curing which is not desirable in many applications. Furthermore, all the examples are including the use isopropyl thioxanthone (ITX) as sensitizer.

Therefore, there is still a need for obtaining a 3D object from silicone photopolymer compositions which give higher elongation-in-break properties of the cured product, in particular well above 140% described in the above reference, adapted to stand 3D-UV printing technologies such as UV-Stereolithography (SLA), UV-Digital Light processing (DLP), Continuous Liquid Interface Production (CLIP), UV-extrusion and Inkjet Deposition. Furthermore, there is also a need for improving tensile strength and other physical properties so that it opens the usage to various fields such as healthcare, electronics, aerospace, transportation, construction, industrial spare parts, sealing and bonding with gaskets.

An object of the present invention is to provide a method for producing a three-dimensional printed article with a photocurable silicone composition which gives higher elongation-in-break properties of the cured product, in particular well above the 140% described in the prior art and with improved tensile strength and other physical properties so that it opens the usage of photocurable silicone composition in 3D printing for various fields such as healthcare, electronics, aerospace, transportation, construction, industrial spare parts, sealing and bonding with gaskets and the like.

Another object of the invention is to provide a method for producing a three-dimensional printed article with a photocurable silicone composition that does not necessarily need the use of a sensitizer such as isopropyl thioxanthone (ITX).

Further another objective of the present invention is to provide a three-dimensional (3D) printed article formed in accordance with the method of the invention.

These objectives, among others, are achieved by the present invention which relates to a method for producing a three-dimensional printed article comprising
1) providing a photocurable composition X, comprising:
(a) for 100 parts by weight of at least one organopolysiloxane polymer CE having the following formula (1):

wherein:
M* is: $R^1(R)_2SiO_{1/2}$;
D is $(R)_2SiO_{2/2}$;

$x \geq 60$, preferably $60 \leq x \leq 500$, and most preferably $90 \leq x \leq 400$.

R is an alkyl group chosen from the group consisting of methyl, ethyl, propyl, trifluoropropyl, and phenyl, and most preferably R is a methyl group, $R^1$ is a moiety of general formula $-C_nH_{2n}O-CH_2CHR^2(CH_2)_m-OCOCH=CHR^3$, wherein n is 3 or 4 and m is 0 or 1, and preferably m is 1, $R^2$ is H, OH or $-C_zH_{2z}-CH_2OH$, z is 0, 1, 2 or 3 and $R^3$ is H or $-CH_3$;

(b) from 0 parts to 20 parts by weight, preferably from 1 to 20 parts by weight, and even more preferably from 1 to 10 parts by weight of at least one organopolysiloxane polymer XL having the following formula (2):

wherein
M is: $R^2(R)_2SiO_1/2$; $(R)_3SiO_{1/2}$ or $R^4(R)_2SiO_{1/2}$
D is $(R)_2SiO_{2/2}$;
$D^{ACR}$ is $(R^2)(R)SiO_{2/2}$;
y is from 0 to 500, preferably from 10 to 500, and most preferably from 50 to 400,
w is from 0 to 50, preferably from 1 to 25, and most preferably from 3 to 20, and when w=0, y is from 1 to 500 and M represents: $R^2(R)_2SiO_{1/2}$ or $R^4(R)_2SiO_{1/2}$;
R is an alkyl group chosen from the group consisting of methyl, ethyl, propyl, trifluoropropyl, and phenyl, and most preferably R is a methyl group,
$R^2$ is a moiety of the following general formulas:
$-C_nH_{2n}O-CH_2CHR^2(CH_2)_m-OCOCH=CHR^3$, wherein n is 3 or 4 and m is 0 or 1, m is 0 or 1, $R^2$ is H, OH or $-C_zH_{2z}-CH_2OH$, z is 0, 1, 2 or 3 and $R^3$ is H or $-CH_3$; or
$-C_nH_{2n}O-COCH=CHR^3$, wherein n is 3 or 4 and $R^3$ is H or $-CH_3$;
$R^4$ is a moiety of formula (3):

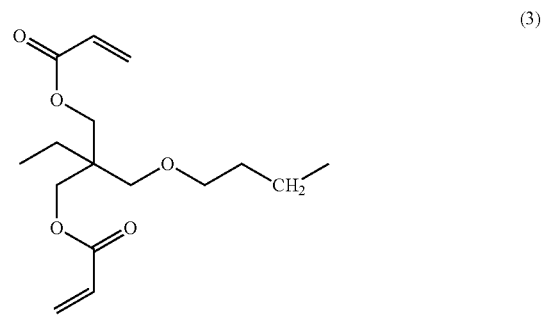 [SMILES: C=CC(=O)OCC(CC)(COCCCC)COC(=O)C=C]

(c) from 0.01 to 10 parts by weight of at least one photoinitiator PI, preferably from 0.01 to 3 parts by weight,
(d) at least 15 parts by weight, preferably from 20 parts to 100 parts by weight, and even more preferably from 20 parts to 50 parts by weight, of at least one inorganic filler F,
(e) from 0 to 10 parts by weight of at least one sensitizer PS, (f) from 0 to 10000 parts by weight of at least one photocurable organic (meth)acrylate-monomer/oligomer M, and
(g) from 0 to 10 parts by weight of at least one additive I,
2) exposing the photocurable composition X to actinic radiation to form a cured cross-section on a plate or support, and
3) repeating steps 1) and 2) on the former cured cross section with new layer to build up the three-dimensional printed article.

To achieve these objectives, the Applicant demonstrated, to its credit, entirely surprisingly and unexpectedly, that by using specific acrylated end-capped silicones (3-acryloxy-2-hydroxypropoxypropyl end-groups according to the invention) versus standard acrylated end-capped silicone ((meth)acryloxypropyl end-groups) according to the prior art in combination with at least 15 parts by weight (for 100 parts by weight of the acrylated end-capped silicones) of an inorganic filler in the said photocurable composition X, it was possible to obtain via 3D-UV printing a cured material which has higher elongation-in-break properties well above 140% described in the prior art, good tensile strength and some improvement of other physical properties so that it opens the usage of photocurable silicone composition in 3D printing for various fields such as healthcare, electronics, aerospace, transportation, construction, industrial spare parts, sealing and bonding with gaskets and the like. The results were obtained without the use of a sensitizer such has isopropylthioxanthone (ITX) which allows more flexibility for the 3D printed process which can use a wider range of 3D-UV printers.

In a preferred embodiment, the organopolysiloxane polymer CE according to the invention has an average molecular weight from 4000 g/mol to 40000 g/mol, preferably from 5700 g/mol to 30000 g/mol, and even more preferably from 5700 g/mol to 24000 g/mol.

In another preferred embodiment, components and the quantities of the components are chosen so as the composition X has a dynamic viscosity below 50 Pa·s at 25° C. and preferentially below 20 Pa·s at 25° C. In such case, the composition X can be processable by common SLA printers or DLP printer such as an ASIGA MAX.

The term "dynamic viscosity" is intended to mean the shear stress which accompanies the existence of a flow-rate gradient in the material. All the viscosities to which reference is made in the present report correspond to a magnitude of dynamic viscosity which is measured, in a manner known per se, at 25° C. or according to standard ASTM D445. The viscosity is generally measured using a Brookfield viscometer.

In a preferred embodiment, the the organopolysiloxane polymer CE comprises as terminal groups meth(acrylate) moieties comprising a hydroxyl group and have the generalized average formula:

M*DxM* wherein
M* is: R1(R)2SiO1/2;
D is (R)2SiO2/2;
$x \geq 60$, preferably $60 \leq x \leq 500$, and most preferably $90 \leq x \leq 400$,
R is an alkyl group chosen from the group consisting of methyl, ethyl, propyl, trifluoropropyl, and phenyl, and most preferably R is a methyl group,
$R^1$ is a moiety of general formula $-C_nH_{2n}O-CH_2CHR^2(CH_2)_m-OCOCH=CHR^3$, wherein n is 3 or 4 and m is 0 or 1, m is 0 or 1, R2 is OH or $-C_zH_{2z}-CH_2OH$, z is 1, 2 or 3 and $R^3$ is H or $-CH_3$.

In another preferred embodiment, the organopolysiloxane polymer CE (polydimethylsiloxane with 3-acryloxy 2-hydroxypropoxypropyl end-groups) has the following formula (4):

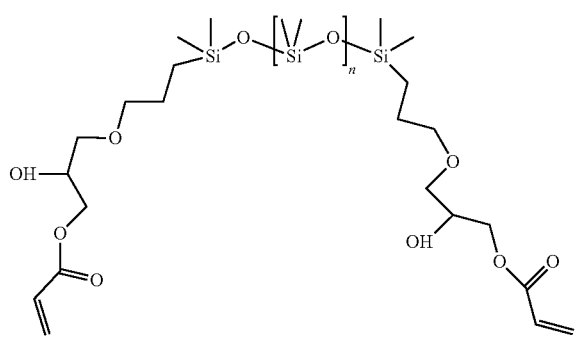

(4)

In which $n \geq 60$, and preferably $60 \leq n \leq 500$, and most preferably $80 \leq n \leq 400$.

In a preferred embodiment, the organopolysiloxane polymer XL is chosen from the group consisting of polymers (5) to (8):

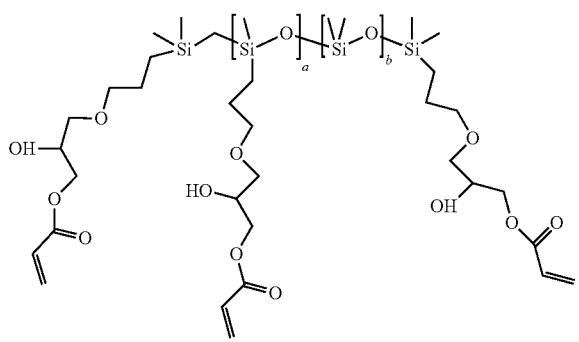

(5)

In which a is from 1 to 20, and preferably a is from 1 to 10, b is from 1 to 500, and preferably b is from 10 to 500.

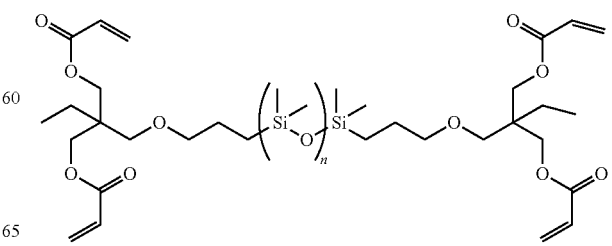

(6)

In which n is from 10 to 400, preferably n is from 50 to 200, and even more preferably n is from 50 to 150.

(7)

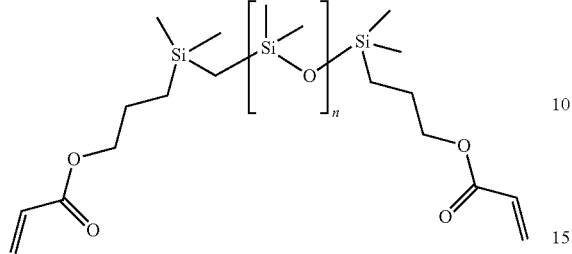

In which n is from 1 to 500, and preferably n is from 1 to 200.

(8)

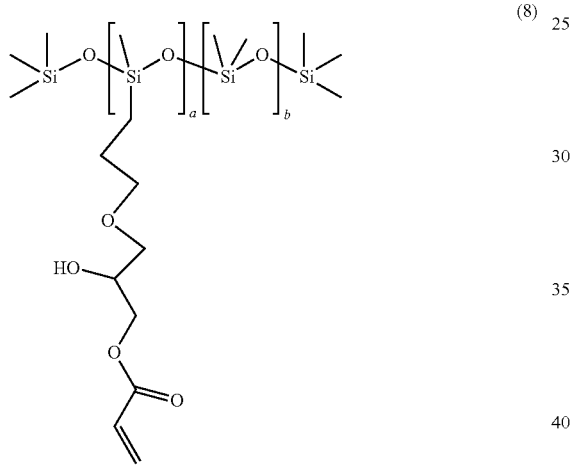

In which a is from 2 to 50, and preferably a is from 2 to 20; b is from 0 to 500, and preferably b is from 10 to 400.

Suitable examples of photoinitiators include acyl phosphorus oxides or acylphosphine oxides. A solvent may be used in combination with the photoinitiator such as isopropyl alcohol (IPA) to solubilize it in the silicone composition.

Suitable photoinitiators according to the invention are those of Norrish type-I which when irradiated with UV light energy cleave to generate radicals. Preferred photoinitiators are derivatives of phosphine oxides such as:

(9)

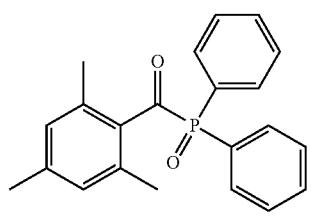

Diphenyl(2,4,6-trimethylbenzoyl)phospine oxide (TPO)

(10)

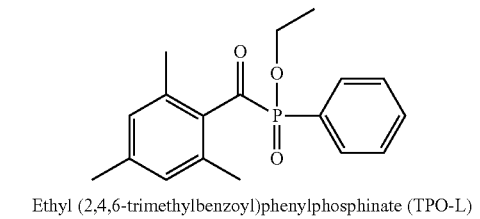

Ethyl (2,4,6-trimethylbenzoyl)phenylphosphinate (TPO-L)

(11)

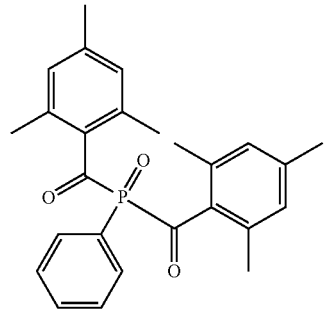

Phenylbis(2,4,6-trimethylbenzoyl)phosphine oxide (BAPO)

(12)

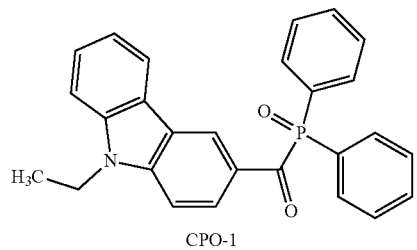

CPO-1

(13)

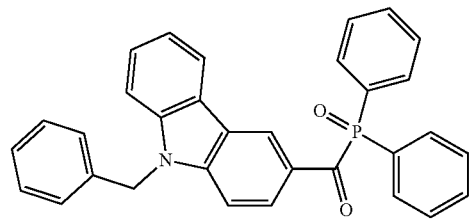

CPO-2

CPO-1 and CPO-2 can be prepared according to the protocol described in Molecules 2020, 25(7), 1671, New Phosphine Oxides as High Performance Near UV Type I Photoinitiators of Radical Polymerization.

Other suitable photoinitiators are liquid bisacyl phosphine oxides such as described in US2016/0168177 A1 or acyl phosphanes such as described in US2008/0004464 The most preferred photoinitiator is ethyl(2,4,6-trimethylbenzoyl)phenylphosphinate (10) (TPO-L).

Suitable inorganic fillers F maybe selected from the group consisting of reinforcing inorganic fillers F1, thermally conductive inorganic fillers F2, electrically conductive inorganic fillers F3, and mixtures thereof.

In some embodiments, the reinforcing inorganic fillers F1 is selected from silicas and/or aluminas, preferably selected from silicas. As silicas that may be used, fillers are envisaged characterized by a fine particle size often less than or equal to 0.1 μm and a high ratio of specific surface area to weight, generally lying within the range of approximately 50 square meters per gram to more than 300 square meters per gram. Silicas of this type are commercially available products and are well known in the art of the manufacture of silicone compositions. These silicas may be colloidal silicas, silicas prepared pyrogenically (silicas called combustion or fumed silicas) or by wet methods (precipitated silicas) or mixtures of these silicas. The chemical nature and the method for preparing silicas capable of forming the inorganic filler are not important for the purpose of the present invention, provided the silica have a reinforcing action on the printed product. Cuts of various silicas may of course also be used. These silica powders have a mean particle size generally close to or equal to 0.1 µm and a BET specific surface area 5 greater than 50 m²/g, preferably between 50 and 400 m²/g, notably between 150 and 350 m²/g. These silicas are optionally pretreated with the aid of at least one compatibilizing agent chosen from the group of molecules that satisfy at least two criteria:

a) have a high interaction with silica in the region of its hydrogen bonds with itself and with the surrounding silicone oil; and b) are themselves, or their degradation products, easily removed from the final mixture by heating under vacuum in a gas flow, and compounds of low molecular weight are preferred.

These silicas may also be treated in situ, by adding an untreated silica and at least one compatibilization agent of nature similar to that which can be used in pre-treatment and as defined above.

The compatibilizing agent is chosen according to the treatment method (pre-treatment or in situ) and may for example be selected from the group comprising: chlorosilanes, polyorganocyclosiloxanes, such as octamethylcyclosiloxane (D4), silazanes, preferably disilazanes, or mixtures thereof, hexamethyldisilazane (HMDZ) being the preferred silazane and that may be associated with divinyltetramethyl-disilazane, polyorganosiloxanes having, per molecule, one or more hydroxyl groups linked to silicon, amines such as ammonia or alkylamines with a low molecular weight such as diethylamine, alkoxysilanes such as methacyloxypropyl trimethoxysilane, organic acids with a low molecular weight such as formic or acetic acids, or acrylic acids and mixtures thereof. In the case of in situ treatment, the compatibilizing agent is preferably used in the presence of water. For more details in this respect, reference may be made for example to patent FR-B-2 764 894.

It is possible to use compatibilizing methods of the prior art providing early treatment by silazane (e.g. FR-A-2 320 324) or a delayed treatment (e.g. EP-A-462 032) bearing in mind that according to the silica used their use will in general not make it possible to obtain the best results in terms of mechanical properties, in particular extensibility, obtained by treatment on two occasions according to the invention.

In a preferred embodiment, the inorganic filler F is chosen from the group consisting of colloidal silica, fumed silica, precipitated silica or mixtures thereof.

As example of a reinforcing inorganic fillers F1, alumina maybe used and in particular a highly dispersible alumina is advantageously employed, doped or not in a known manner. It is of course possible also to use cuts of various aluminas. Preferably, the reinforcing filler used is a combustion silica, taken alone or mixed with alumina.

The use of a complementary filler such as a thermally conductive inorganic fillers F2 and/or an electrically conductive inorganic fillers F3 may be envisaged according to the invention. Both maybe surface treated by a surface area modifying agent which is used to control the morphology of the filler shape and/or fill the internal voids/pores of the fillers. The introduction of surface area modifying agent decreases the overall surface area of the filler.

Suitable thermally conductive inorganic fillers F2 include boron nitride, aluminum nitride, copper, silver, aluminum, magnesium, brass, gold, nickel, alumina, zinc oxide, magnesium oxides, iron oxide, silver oxide, copper oxide, metal-coated organic particles, silver plated nickel, silver plated copper, silver plated aluminum, silver plated glass, silver flake, silver powder, carbon black, graphite, diamond, carbon nanotube, silica and mixtures thereof. Preferably, the thermally conductive inorganic fillers F2 are boron nitride.

Suitable electrically conductive inorganic fillers F3 include a metal or other component. In particular, it may include, for example, fillers such as carbon black, graphite, metallic components, such as aluminum, copper, brass, bronze, nickel or iron, conductive inorganic pigments, such as tin oxide, iron oxide, and titanium dioxide, inorganic salts, and combinations thereof. Of particular use is graphite, and particularly synthetic graphite. It may also include synthetic graphite, natural graphite, and combinations thereof. A specific embodiment may also include silver particles, silver-coated core particles, and carbon nanotubes.

When present, the sensitizer PS is within the range of 1 ppm to up to 10 parts by weight. An optimum usage is within the range of 10 to 100 ppm of the whole content of composition X.

By sensitizer it is meant a molecule that absorb the energy of light and act as donors by transferring this energy to acceptor molecules.

Examples of suitable sensitizer PS include the group consisting of benzophenone and its derivatives, thioxanthone and its derivatives, anthraquinone and its derivatives, benzyl ester formates, camphorquinone, benzil, phenanthrenequinone, coumarins and cetocoumarines and their mixtures.

By benzophenone derivatives is meant substituted benzophenones and polymeric versions of benzophenone. The term "thioxanthone derivatives" refers to substituted thioxanthones and to anthraquinone derivatives, to substituted anthraquinones, in particular to anthraquinone sulfonic acids and acrylamido-substituted anthraquinones.

As specific examples of suitable sensitizer PS mention may be made, in particular, of the following products: isopropylthioxanthone; benzophenone; camphorquinone; 9-xanthenone; anthraquinone; 1-4 dihydroxyanthraquinone; 2-methylanthraquinone; 2,2'-bis (3-hydroxy-1,4-naphthoquinone); 2,6-dihydroxyanthraquinone; 1-hydroxycyclohexyl-phenylketone; 1,5-dihydroxyanthraquinone; 1,3-diphenyl-1,3-propane-dione; 5,7-dihydroxyflavone; dibenzoylperoxide; 2-benzoylbenzoic acid; 2-hydroxy-2-methylpropionophenone; 2-phenylacetophenone; anthrone; 4,4'-dimethoxybenzoin; phenanthrenequinone; 2-ethylanthraquinone; 2-methylanthraquinone; 2-ethylanthraquinone; 1,8-dihydroxyanthraquin-one; dibenzoyl peroxide; 2,2-dimethoxy-2-phenylacetophenone; benzoin; 2-hydroxy-2-methylpropiophenone; benzaldehyde; 4-(2-hydroxyethoxy) phenyl-(2-hydroxy-2-methylpropyl) ketone; benzoyl-acetone; ethyl (2,4,6-trimethylbenzoyl) phenyl phosphinate and mixtures thereof.

As examples of commercial products of sensitizer PS mention may be made of the following products: Esacure® TZT, Speedcure® MBP, Omnipol® BP and thioxanthone derivatives, Irgacure® 907, Omnipol® TX and Genopol® TX-1 products.

Other examples include compounds of the types of xanthones or substituted thioxanthones described in WO2018/234643 and the following compounds (14) to (30):

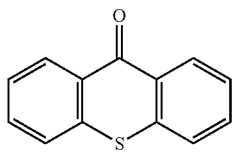 (14)
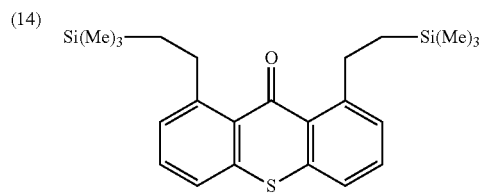 (15)
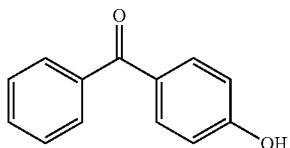 (16)
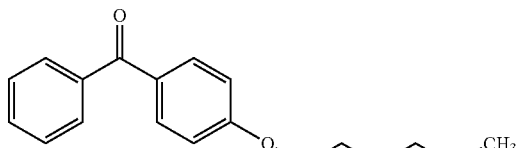 (17)
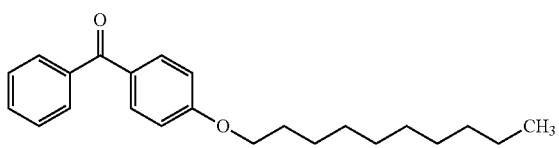 (18)
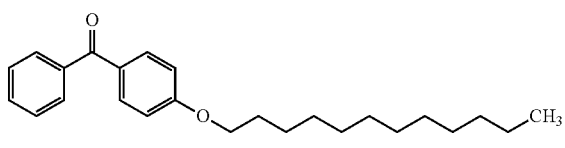 (19)
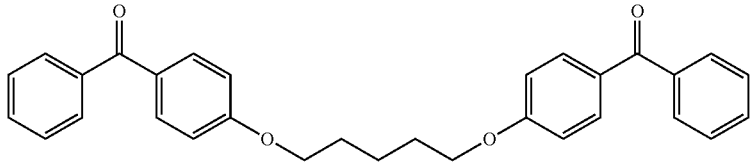 (20)
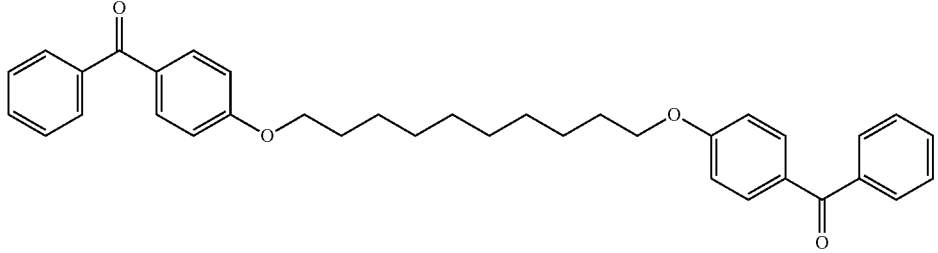 (21)
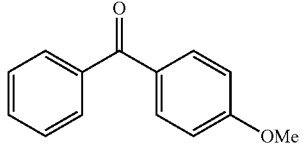 (22)
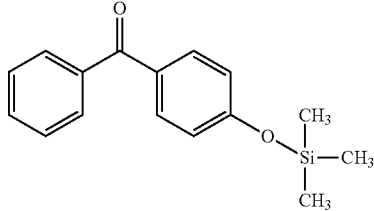 (23)
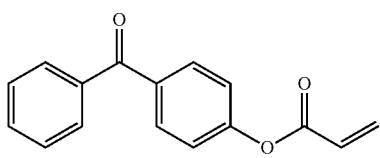 (24)
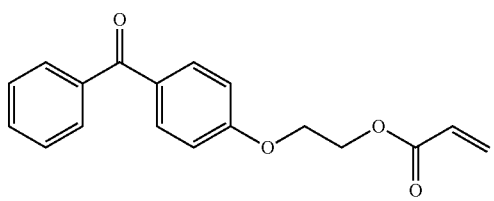 (25)
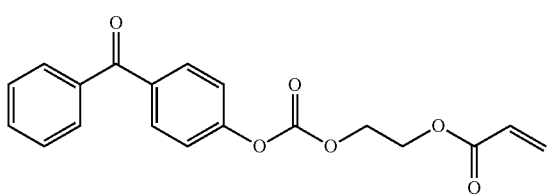 (26)
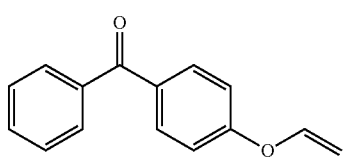 (27)

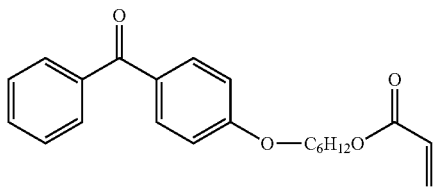

(28)

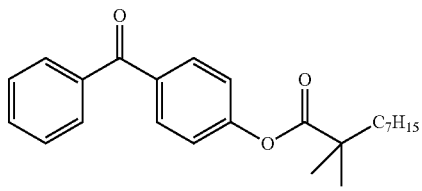

(29)

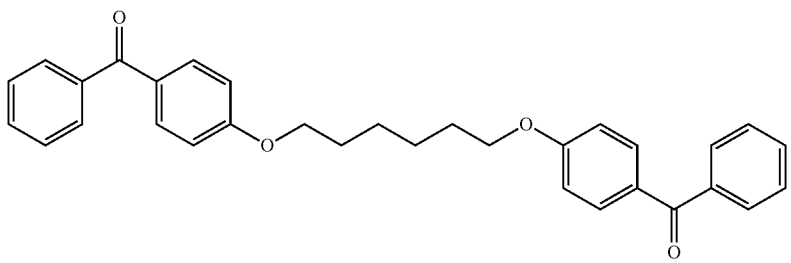

(30)

As another example of benzophenone that is useful according to the invention, mention may be made of the compound (31):

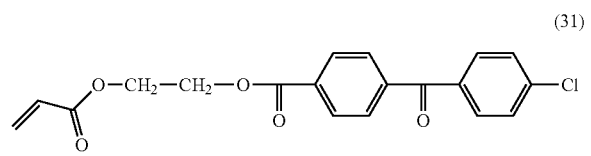 [SMILES: C=CC(=O)OCCOC(=O)c1ccc(C(=O)c2ccc(Cl)cc2)cc1]

(31)

This compound corresponds to the product Ebecryl P36 (CAS: 85340-63-2).

When a photocurable organic (meth)acrylate-monomer/oligomer M is present, it may be useful to add a sensitizer as described above.

Example of suitable photocurable organic (meth)acrylate-monomers/oligomers M include, but are not limited to the followings, polyethylene glycol diacrylate (PEGDA), 1,6-bis-(metalocriloxi-2-etoxicarbolamino)-2,4,4-trimethyl-exane (UDMA), triethylene glycol dimethacrylate (TEGDMA), bisphenol A-glycidyl methacrylate or 2,2-bis-4-2-(hydroxi-3-metacriloxiprop-1-oxi)propane (Bis-GMA), trimethylolpropane triacrylate (TTA) and bisphenol A ethoxylate diacrylate (Bis-EDA).

The present curable silicone composition may optionally comprise at least one additive I so long as they do not interfere with the curing mechanisms or adversely affect the target properties. Said additive is chosen as a function of the applications in which said compositions are used and of the desired properties. It may include various types of additives, used alone or as a mixture, such as pigments, delustrants, matting agents, heat and/or light stabilizers, antistatic agents, flame retardants, antibacterial agent, antifungal agent and thixotropic agent.

In a preferred embodiment, the components and the quantities of the components (a) to (g) are chosen so as the composition X has a dynamic viscosity below 50 Pa·s at 25° C. and preferentially below 20 Pa·s at 25° C. to allow an easy use with standard UV-3D printers.

In a preferred embodiment, the photocurable composition X is provided via a 3D printer using a technology chosen from the group consisting of UV-stereolithography (SLA), UV-Digital Light processing (DLP), Continuous Liquid Interface Production (CLIP), Inkjet Deposition and UV extrusion. These technologies and related 3D printing equipments are well known to the person skilled in the art.

For building the object a 3D digital file is used, for example via CAD software (such as SolidWorks, Sculpt or SelfCAD). These files (usually STL files), are processed by a slicer, which cuts the model into thin layers to print. The instructions are then sent to a 3D printer.

Other advantages and features of the present invention will appear on reading the following examples that are given by way of illustration and that are in no way limiting.

EXAMPLES

I) Raw Materials Used in the Examples

1) Polydimethylsiloxane with bis(3-acryloxy2-hydroxypropoxypropyl) end-groups CE:

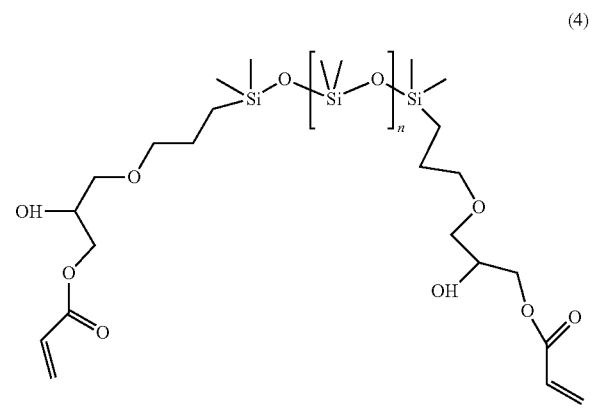

(4)

Polydimethylsiloxane polymer CE-1 (comparative): n=6; viscosity 170 mPa·s at 25° C.

Polydimethylsiloxane polymer CE-2 (comparative) n=45, viscosity 200 mPa·s at 25° C.

Polydimethylsiloxane polymer CE-3 (Invention) n is from 250 to 280; viscosity 1200 mPa·s at 25° C.

2) Polydimethylsiloxane with bis(acryloxypropyl) end-groups CE (comparative):

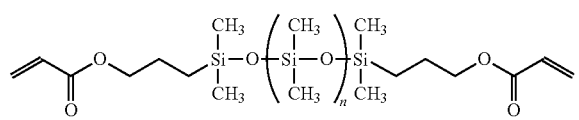

Polydimethylsiloxane polymer CE-4 (comparative) n=130, viscosity 430 mPa·s 3) Polydimethylsiloxane with (acryloxy-2-hydroxypropoxypropyl) groups in the chain XL:

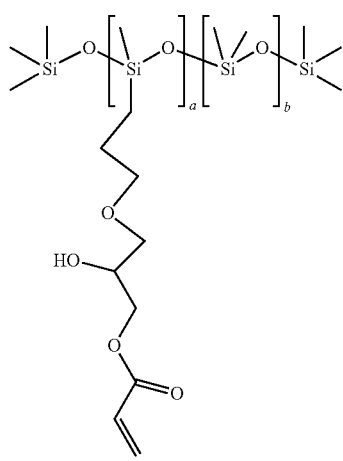

(8)

Polydimethylsiloxane polymer XL-1; a is from 3 to 4 and b is around 220.

Polydimethylsiloxane polymer XL-2; a is from 7 to 8 and b is around 80.

4) Polymer XL-3: n=95:

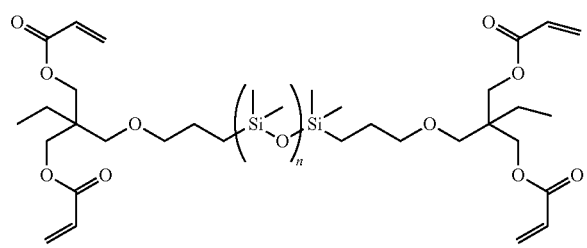

(6)

5) Polydimethylsiloxane with (3-acryloxy 2-hydroxy-propoxypropyl) end-groups and in the chain XL-4 (with a is from 2 to 3 and b from 140 to 170)

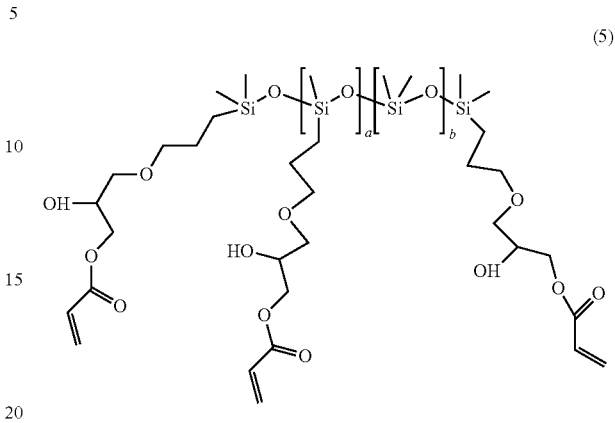

(5)

6) Inorganic filler F1: Pyrogenic Silica surface treated (trimethylsiloxy) sold by Wacker under the tradename HDK® H2000.

7) Photoinitiators PI:
TPO-L: 2,4,6-trimethylbenzoyidi-phenylphosphinate.
BAPO: Phenylbis (2,4,6-trim ethyl be nzoyl) phosphine oxide.
TPRO: 2,4,6-Trimethylbenzoyldiphenylphosphine oxide.

8) Solvent: IPA=isopropylalcohol.

9) Additives: Kri-Color Trans Pigment (Pigment)

II) Physical Properties

Viscosity: The viscosity of the sample is measured at 25° C. according to ASTM D445 or ISO3104.

Hardness: The hardness of the cured sample is measured at 25° C. according to ASTM D2240 or ISO868.

Tensile strength and Elongation at break: Tensile strength and elongation at break of the cured sample based on the curable silicone composition are measured at 25° C. according to ASTM D412 or ISO37.

Tear strength: Tear strength of the cured sample is measured at 25° $^1$C according to ASTM D624 or ISO34-1.

II) Formulations (Curing and 3D-Printed with a 3D Printer Asiga)

Formulations were prepared according to Tables 1, 2, 3 or 4.

They were then mixed either manually or with a speed mixer. The resulting mixtures were then poured into the vat of the Asiga 3D printer having a capacity of 1 liter and with a printing plate of XYZ: 119×67×75 mm. An ".stl" file of a H2 specimen (length 40 mm+/−0.5, thickness 2 mm+/−0.2) was then designed. The 2 mm thickness specimens are prepared with an ".stl" file and a building procedure of 27 layers. Each layer has a thickness of 75 micrometers. The first layer is irradiated during 30 s to achieve a good adhesion to the platform, and the following layers are irradiated during 20 s for each layer at 385 nm and 5.8 mW/cm². After 3D printing the specimen can be post-cured at 405 nm in an UV box/recto/verso during 180 s.

The physical properties are quoted in the following Tables.

TABLE 1

Formulations and physical properties (% by weight).

| | Examples | | |
|---|---|---|---|
| | 1-Comp. | 2-Comp. | 3-Invention |
| Polymer CE-1 | 75.00% | 0.00% | 0.00% |
| Polymer CE-2 | 0.00% | 75.00% | 0.00% |
| Polymer CE-3 | 0.00% | 0.00% | 75.00% |
| Polydimethylsiloxane polymer XL-1 | 4.00% | 4.00% | 4.00% |
| Inorganic filler F1 | 30.00% | 30.00% | 30.00% |
| Photoinitiator TPO-L | 1.00% | 1.00% | 1.00% |
| Mechanical Properties | | | |
| Tensile (psi) | Too Brittle to Test | Too Brittle to Test | 366 |
| Tensile (MPa) | | | 2.52 |
| Elongation (%) | | | 182 |
| Tear (lb/inch) | | | 26 |
| Tear (N/mm) | | | 4.55 |
| Hardness (Shore A) | 90 | 72 | 28.2 |

TABLE 2

Formulations and physical properties (% by weight).

| | Examples | | | | |
|---|---|---|---|---|---|
| | 4-Comp. | 5-Inv. | 6-Inv. | 7-Inv. | 8-Inv. |
| Polymer CE-3 | 100.00% | 100.00% | 100.00% | 100.00% | 100.00% |
| Polydimethylsiloxane polymer XL-1 | 5.09% | 5.33% | 5.04% | 5.11% | 5.11% |
| Inorganic filler F1 | 11.83% | 26.67% | 45.80% | 51.26% | 57.66% |
| Pigment | 0.24% | 0.00% | 0.00% | 1.58% | 0.00% |
| Photoinitiator TPO-L | 0.24% | 0.27% | 0.31% | 0.32% | 0.33% |
| Tensile (psi) | 278 | 306 | 384 | 458 | 588 |
| Tensile (MPa) | 1.92 | 2.11 | 2.65 | 3.16 | 4.05 |
| Elongation (%) | 108 | 214 | 196 | 200 | 252 |
| Tear (lb/in) | 11 | 15.1 | 59 | 67 | 90 |
| Tear (N/mm) | 1.93 | 2.64 | 10.33 | 11.73 | 15.76 |
| Hardness (Shore A) | 27 | 28.5 | 25.9 | 32.9 | 34.5 |

The comparison of Example 4 (comparative) versus examples 5 to 8 (according to the invention) shows that by using a specific acrylated end-capped silicones (acryloxypropoxypropyl end-groups according to the invention in combination with at least 15 parts by weight (for 100 parts by weight of the acrylated end-capped silicones) of an inorganic filler, it was possible to obtain via 3D-UV photoprinting a cured material which has higher elongation-in-break properties well above 140% described in the prior art, and with very good tensile strength and tear properties when the filler is present above.

TABLE 3

Formulations and physical properties (% by weight) at 5 mW/cm²

| | Examples | | |
|---|---|---|---|
| | 9 | 10 | 11 |
| Polymer CE-3 | 100.00% | 0 | 0 |
| Polydimethylsiloxane polymer CE-4 (comparative) | 0 | 100.00% | 0 |
| Polydimethylsiloxane with (methacryloxypropyl) end-groups XL-3 | 0 | 0 | 100.00% |
| Photoinitiator TPO-L | 0.40% | 0.40% | 0.40% |
| Elongation (%) | 108 | 70 | 50 |

A comparison between examples 9 and 10 shows that polydimethylsiloxane with (acryloxypropoxypropyl) end-groups CE as used in the invention is already showing a superior properties (even with no inorganic filler) in terms of elongation in break properties (+30%) compared to the standard polydimethylsiloxane with acryloxypropyl end-groups CE-4 used in the prior art.

TABLE 4

Formulations and physical properties (% by weight).

| | Examples | | |
|---|---|---|---|
| | 10-Inv. | 11-Inv. | 12-Inv. |
| Polymer CE-3 | 75% | 75% | 75% |
| Polydimethylsiloxane with (acryloxyhydroxypropoxypropyl) groups in the chain XL-1 | 4% | 0 | 0 |
| Polydimethylsiloxane with (acryloxyhydroxypropoxypropyl) groups in the chain XL-2 | 0 | 4% | 0 |

TABLE 4-continued

Formulations and physical properties (% by weight).

| | Examples | | |
|---|---|---|---|
| | 10-Inv. | 11-Inv. | 12-Inv. |
| Polydimethylsiloxane with (acryloxyhydroxypropoxypropyl) end-groups and in the chain XL-4 | 0 | 0 | 4% |
| Inorganic filler F1 | 20% | 20% | 20% |
| Photoinitiator TPO-L | 1% | 1% | 1% |
| Tensile (psi) | 306 | 340 | 305 |
| Tensile (MPa) | 2.11 | 2.34 | 2.10 |
| Elongation (%) | 214 | 150 | 150 |
| Tear (lb/in) | 15.1 | 10.19 | 13.95 |
| Tear (N/mm) | 2.64 | 1.78 | 2.44 |
| Hardness (Shore A) | 28.5 | 26.8 | 32 |

In Table 4, it was possible to attain excellent elongation-in-break properties with a wide variety of polydimethylsiloxanes with acrylates groups (crosslinkers).

The invention claimed is:

1. A method for producing a three-dimensional printed article comprising
   1) providing a photocurable composition X, comprising:
      (a) for 100 parts by weight of at least one organopolysiloxane polymer CE having the following formula (1):

$$M^*D_xM^* \qquad (1)$$

wherein:

M* is: $R^1(R)_2SiO_{1/2}$;

D is $(R)_2SiO_{2/2}$;

x≥60,

R is an alkyl group chosen from the group consisting of methyl, ethyl, propyl, trifluoropropyl, and phenyl, $R^1$ is a moiety of general formula —$C_nH_{2n}$O—$CH_2CHR^2(CH_2)_m$—OCOCH=$CHR^3$, wherein n is 3 or 4 and m is 0 or 1, $R^2$ is H, OH or —$C_zH_{2z}$—$CH_2OH$, z is 1, 2 or 3 and $R^3$ is H or —$CH_3$;

(b) from 0 parts to 20 parts by weight, of at least one organopolysiloxane polymer XL having the following formula (2):

(2)

wherein

M is: $R^2(R)_2SiO_{1/2}$; $(R)_3SiO_{1/2}$ or $R^4(R)_2SiO_{1/2}$

D is $(R)_2SiO_{2/2}$;

$D^{ACR}$ is $(R^2)(R)SiO_{2/2}$;

v is from 0 to 500, w is from 0 to 50, and when w=0, v is from 1 to 500 and M represents: $R^2(R)_2SiO_{1/2}$ or $R^4(R)_2SiO_{1/2}$;

R is an alkyl group chosen from the group consisting of methyl, ethyl, propyl, trifluoropropyl, and phenyl, $R^2$ is a moiety of the following general formulas:

—$C_nH_{2n}$O—$CH_2CHR^2(CH_2)_m$—OCOCH=$CHR^3$, wherein n is 3 or 4, m is 0 or 1, $R^2$ is H, OH or —$C_zH_{2z}$—$CH_2OH$, z is 1, 2 or 3 and $R^3$ is H or —$CH_3$; or —$C_nH_{2n}$O—COCH=$CHR^3$, wherein n is 3 or 4 and $R^3$ is H or —$CH_3$;

$R^4$ is a moiety of formula (3):

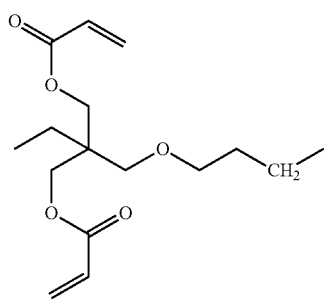
(3)

(c) from 0.01 to 10 parts by weight of at least one photoinitiator PI, (d) from 20 parts to 100 parts by weight of at least one inorganic filler F, (e) from 0 to 10 parts by weight of at least one sensitizer PS, (f) from 0 to 10000 parts by weight of at least one photocurable organic (meth)acrylate-monomer/oligomer M, and (g) from 0 to 10 parts by weight of at least one additive I;

2) exposing the photocurable composition X to actinic radiation to form a cured cross-section on a plate or support, and 3) repeating steps 1) and 2) on the former cured cross section with new layer to build up the three-dimensional printed article.

2. The method of claim 1, wherein the organopolysiloxane polymer CE has an average molecular weight from 4000 g/mol to 40000 g/mol.

3. The method of claim 1, wherein the organopolysiloxane polymer CE comprises as terminal groups meth(acrylate) moieties comprising a hydroxyl group and have the average formula:

$M^*D_xM^*$ 

wherein

M* is: $R^1(R)_2SiO_{1/2}$;

D is $(R)_2SiO_{2/2}$;

x≥60,

R is an alkyl group chosen from the group consisting of methyl, ethyl, propyl, trifluoropropyl, and phenyl, $R^1$ is a moiety of general formula —$C_nH_{2n}$O—$CH_2CHR^2(CH_2)_m$—OCOCH=$CHR^3$, wherein n is 3 or 4, m is 0 or 1, $R^2$ is OH or —$C_zH_{2z}$—$CH_2OH$, z is 1, 2 or 3 and $R^3$ is H or —$CH_3$.

4. The method of claim 1, wherein the organopolysiloxane polymer CE has the following formula (4):

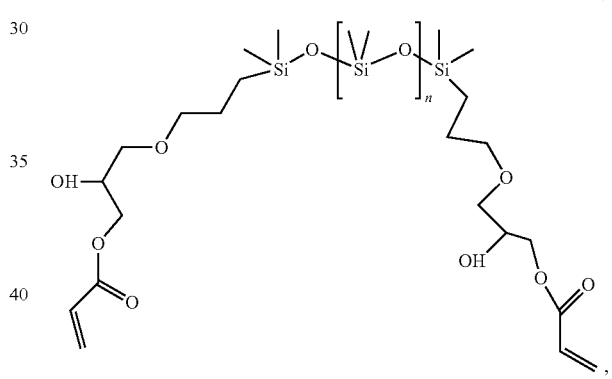
(4)

wherein n≥60.

5. The method of claim 1, wherein the organopolysiloxane polymer XL is chosen from the group consisting of polymers (5) to (8):

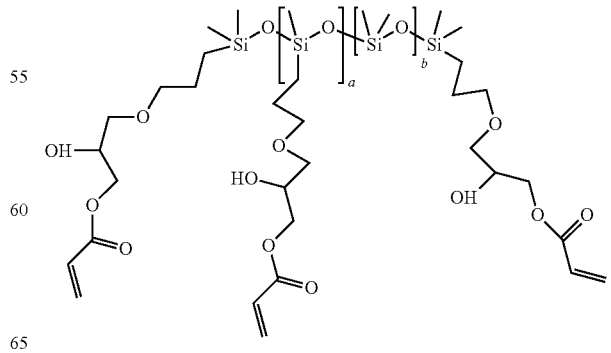
(5)

wherein a is from 1 to 20, and b is from 1 to 500,

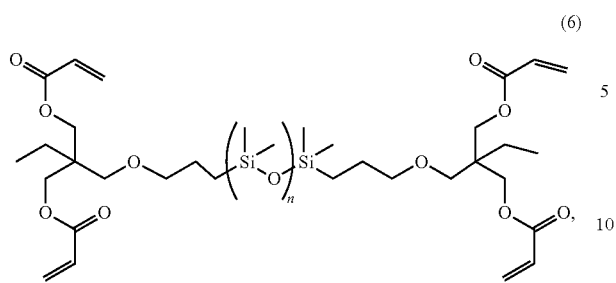

(6)

wherein n is from 10 to 400,

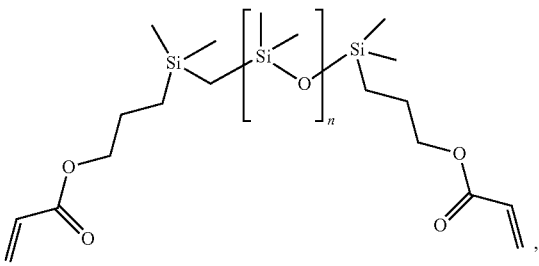

(7)

wherein n is from 1 to 500,

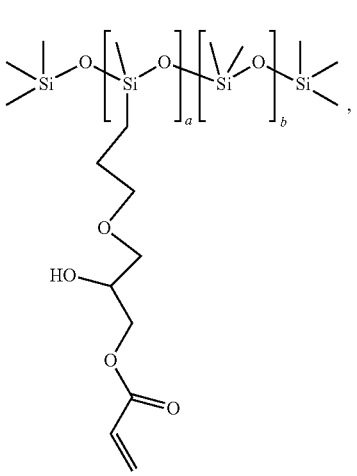

(8)

wherein a is from 2 to 50; and b is from 0 to 500.

6. The method of claim 1, wherein the inorganic filler F is chosen from the group consisting of colloidal silica, fumed silica, precipitated silica or mixtures thereof.

7. The method of claim 1, wherein the components and the quantities of the components are chosen so as the composition X has a dynamic viscosity below 50 Pa·s at 25° C.

8. The method of claim 1, wherein the photocurable composition X is provided via a 3D printer using a technology chosen from the group consisting of UV-stereolithography (SLA), UV-Digital Light processing (DLP), Continuous Liquid Interface Production (CLIP), Inkjet Deposition and UV extrusion.

* * * * *